(12) United States Patent
Hui et al.

(10) Patent No.: US 9,896,941 B2
(45) Date of Patent: Feb. 20, 2018

(54) FAN BLADE COMPOSITE COVER WITH TAPERED EDGES

(71) Applicant: UNITED TECHNOLOGIES CORPORATION, Farmington, CT (US)

(72) Inventors: Kwan Hui, Manchester, CT (US); Michael A. Weisse, Tolland, CT (US); Larry Foster, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 545 days.

(21) Appl. No.: 14/597,812

(22) Filed: Jan. 15, 2015

(65) Prior Publication Data

US 2015/0267541 A1    Sep. 24, 2015

Related U.S. Application Data

(60) Provisional application No. 61/928,165, filed on Jan. 16, 2014.

(51) Int. Cl.
*F01D 5/14* (2006.01)
*F01D 5/18* (2006.01)
(Continued)

(52) U.S. Cl.
CPC .............. *F01D 5/147* (2013.01); *F01D 5/141* (2013.01); *F01D 5/18* (2013.01); *F01D 5/282* (2013.01);
(Continued)

(58) Field of Classification Search
CPC . F01D 5/141; F01D 5/147; F01D 5/18; F01D 5/282; F05D 2220/323;
(Continued)

(56) References Cited

U.S. PATENT DOCUMENTS 3,695,778 A    10/1972  Taylor
5,725,355 A *   3/1998  Crall ...................... F01D 5/147
                                                    416/229 A
(Continued)

FOREIGN PATENT DOCUMENTS

EP      2727681 A1      5/2014
WO      0149975 A1      7/2001
WO      WO 01/49975 A1  7/2001

OTHER PUBLICATIONS

European Search Report for related European Application No. 15151404.9; report dated Jun. 1, 2015.
(Continued)

*Primary Examiner* — Igor Kershteyn
(74) *Attorney, Agent, or Firm* — Cantor Colburn LLP

(57) ABSTRACT

A fan blade for a turbofan gas turbine engine is disclosed. The fan blade includes a body having a pressure side and a suction side and a cover. The suction side of the body includes an opening exposing at least one cavity to reduce the weight of the fan blade. The cover overlays the opening and includes a leading portion and a trailing portion that are tapered in the direction of the cover leading edge and cover trailing edge.

20 Claims, 4 Drawing Sheets

(51) Int. Cl.
  *F01D 5/28* (2006.01)
  *F04D 29/32* (2006.01)
(52) U.S. Cl.
  CPC ...... *F04D 29/324* (2013.01); *F05D 2220/323* (2013.01); *F05D 2220/36* (2013.01); *F05D 2230/51* (2013.01); *F05D 2230/60* (2013.01); *F05D 2250/292* (2013.01); *F05D 2300/603* (2013.01); *Y02T 50/672* (2013.01); *Y02T 50/673* (2013.01); *Y10T 29/49337* (2015.01)
(58) Field of Classification Search
  CPC ............. F05D 2220/36; F05D 2230/51; F05D 2230/60; F05D 2250/292; F05D 2300/603; F04D 29/324; Y02T 50/672; Y10T 29/49337
  See application file for complete search history.

(56) References Cited

U.S. PATENT DOCUMENTS

| | | | | |
|---|---|---|---|---|
| 6,033,186 | A * | 3/2000 | Schilling | B63H 1/26 416/233 |
| 6,039,542 | A * | 3/2000 | Schilling | F01D 5/16 416/224 |
| 6,364,616 | B1 * | 4/2002 | Stevenson | B64C 11/00 416/224 |
| 6,514,040 | B2 * | 2/2003 | Lewis | F01D 5/147 415/119 |
| 7,156,622 | B2 * | 1/2007 | Schreiber | B23P 15/04 416/224 |
| 7,189,064 | B2 * | 3/2007 | Helder | B23K 20/122 416/232 |
| 7,942,639 | B2 * | 5/2011 | Burdgick | F01D 5/147 416/231 R |
| 2005/0249601 | A1 * | 11/2005 | Burdgick | F01D 5/147 416/229 A |
| 2007/0292274 | A1 * | 12/2007 | Burdgick | F01D 5/282 416/229 A |
| 2008/0253885 | A1 * | 10/2008 | Foose | F01D 5/147 415/208.2 |
| 2011/0211965 | A1 | 9/2011 | Deal et al. | |
| 2013/0108470 | A1 | 5/2013 | Weisse | |

OTHER PUBLICATIONS

European Search Report and Written Opinion; International Application No. 15151404.9; International Filing Date: Jan. 16, 2015; dated Jun. 4, 2015; 7 pages.

* cited by examiner

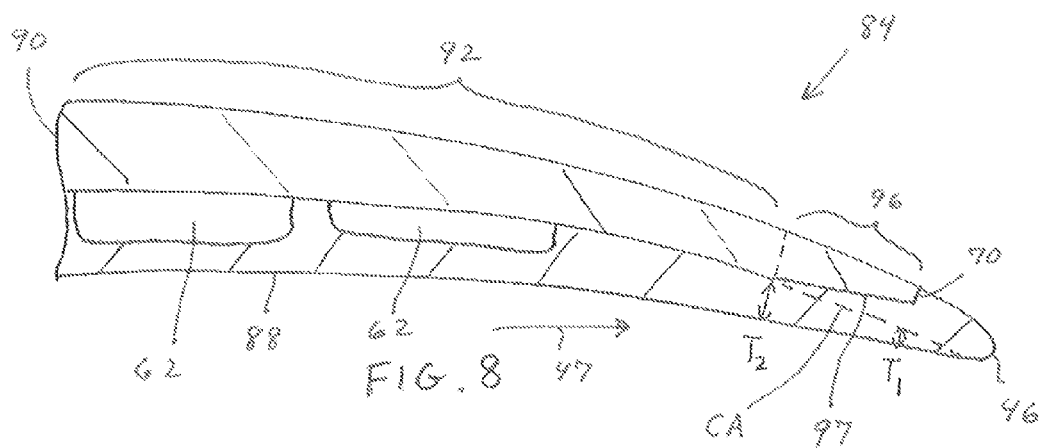

FAN BLADE COMPOSITE COVER WITH TAPERED EDGES

CROSS-REFERENCE TO RELATED APPLICATION

This Application is a non-provisional patent application claiming priority under 35 USC §119(e) to U.S. Provisional Patent Application Ser. No. 61/928,165 filed on Jan. 16, 2014.

FIELD OF THE DISCLOSURE

Disclosed herein are fan blades for turbofan gas turbine engines. In one example, a disclosed fan blade may include a metallic body having an opening communicating with one or more hollow cavities on a suction side of the fan blade for weight reduction and a composite cover that encloses the hollow cavities.

BACKGROUND OF THE DISCLOSURE

Gas turbine engines, such as those used on jet aircraft, generally comprise an air intake port, a fan mounted on a hub near the air intake port and surrounded by a fan case, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The fan and LPC section may be operably connected to the low pressure turbine by an inner drive shaft which rotates about an engine center axis. A cone-like spinner may be mounted over the hub forward the fan blades to help guide air flow.

Some sections of the engine include airfoil assemblies comprising airfoils (typically blades or vanes) mounted at one or both ends to an annular endwall. Included among these sections is the fan section in which fan blades drive air flow into the engine core.

Weight reduction in gas turbine engines used for aircraft results in fuel savings. One known means for reducing the weight of a gas turbine engine is to include hollow cavities in some of the components that do not need to be solid metal to meet structural requirements. One such component is the fan blade.

Some fan blades comprise a metallic body made of titanium or aluminum or other metallic materials with an opening located on the non-flow path, convex side of the fan blade, also known as the suction side of the fan blade, wherein the opening communicates with recesses or cavities. The opposite side of the fan blade is the concave or pressure side. The opening is covered by a composite cover, typically made from fiber and resin plies. This disclosure applies to fan blades where the fan blade body preferably is made of a denser material than the cover.

The cover has a cover leading edge and a cover trailing edge which generally correspond to the fan blade leading edge and the fan blade trailing edge. The cover may have a constant thickness. However, the thickness of the fan blade varies because of its airfoil shape. Consequently, the thickness of the fan blade body varies, and is smallest near the leading edge and trailing edge, especially near the blade tip. This configuration can result in the fan blade body under the leading edge and the trailing edge of the cover being too thin to provide sufficient strength against liberation of the edge of the fan blade body.

This problem can be addressed by moving the cover leading and trailing edges of the relatively lighter (less dense) cover inward, but the resulting fan blade will have greater mass along its leading and trailing edges near the blade tip, which could lower the torsional stiffness of the blade. If the lower torsional stiffness leads to a low order natural frequency of the blade that is in the engine operating range, that circumstance can cause excessive torsional vibration during operation which can be deleterious to fan blade performance and fan blade life.

The present disclosure addresses these problems and others.

SUMMARY OF THE DISCLOSURE

The disclosure relates to a fan blade for a turbofan jet engine, the fan blade having a body and a cover. The body has a pressure side and a suction side adjoining the pressure side along a fan blade leading edge and a fan blade trailing edge. The suction side defines an opening having a perimeter and communicating with one or more cavities disposed in the suction side. The cover is configured to fit over the opening and comprises a cover leading edge and a cover trailing edge which generally align with the fan blade leading edge and the fan blade trailing edge respectively.

In one aspect of the disclosure the cover comprises a central portion, a leading portion extending forward of the central portion and terminating at the cover leading edge, and a trailing portion extending aft of the central portion and terminating at the cover trailing edge. The cover leading portion and/or the cover trailing portion are chamfered, that is, made thinner such as by tapering or beveling.

Preferably the cover leading portion becomes thinner in the direction of the cover leading edge and the cover trailing portion becomes thinner in the direction of the cover trailing edge.

The chamfered surfaces of the cover leading portion and the cover trailing portion may be flat, curved, stepped or any suitable configuration.

The cover leading portion may have the same thickness as the central portion, then taper to a smaller thickness at the cover leading edge. Likewise, the cover trailing portion may have the same thickness as the central portion, then taper to a smaller thickness at the cover trailing edge.

The fan blade body may have an area of minimal thickness located inward of the cover leading and trailing edges.

The fan blade body may be chamfered near the leading edge and trailing edge so that the body and the cover mate and abut along their respective chamfered surfaces.

In another aspect of the disclosure a method for fabricating a fan blade of a turbofan gas turbine engine is provided, comprising the steps of:

manufacturing a body including a pressure side and a suction side, the pressure side and the suction side being disposed between and connected to a leading edge and a trailing edge, the suction side defining an opening communicating with one or more cavities in the suction side;

providing a cover configured to fit over the opening and comprising a cover leading edge and a cover trailing edge, the cover further comprising a central portion, a chamfered leading portion extending forward of the central portion and terminating at the cover leading edge, and a chamfered trailing portion extending aft of the central portion and terminating at the cover trailing edge; and covering the opening with the cover.

Preferably the cover leading portion becomes thinner in the direction of the cover leading edge, and the cover trailing portion becomes thinner in the direction of the cover trailing edge.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 8 is a close up view of a portion of the fan blade of FIG. 7.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PREFERRED EMBODIMENTS

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air intake port end and the aft end generally refers to the exhaust end. When referring to a fan blade, the "leading edge" generally means the edge upstream of the air flow, and the "trailing edge" generally means the edge downstream of the air flow. Finally, "radially outward" generally refers to a direction away from the engine center axis while "radially inward" refers to a direction toward the engine center axis.

Figure 1:
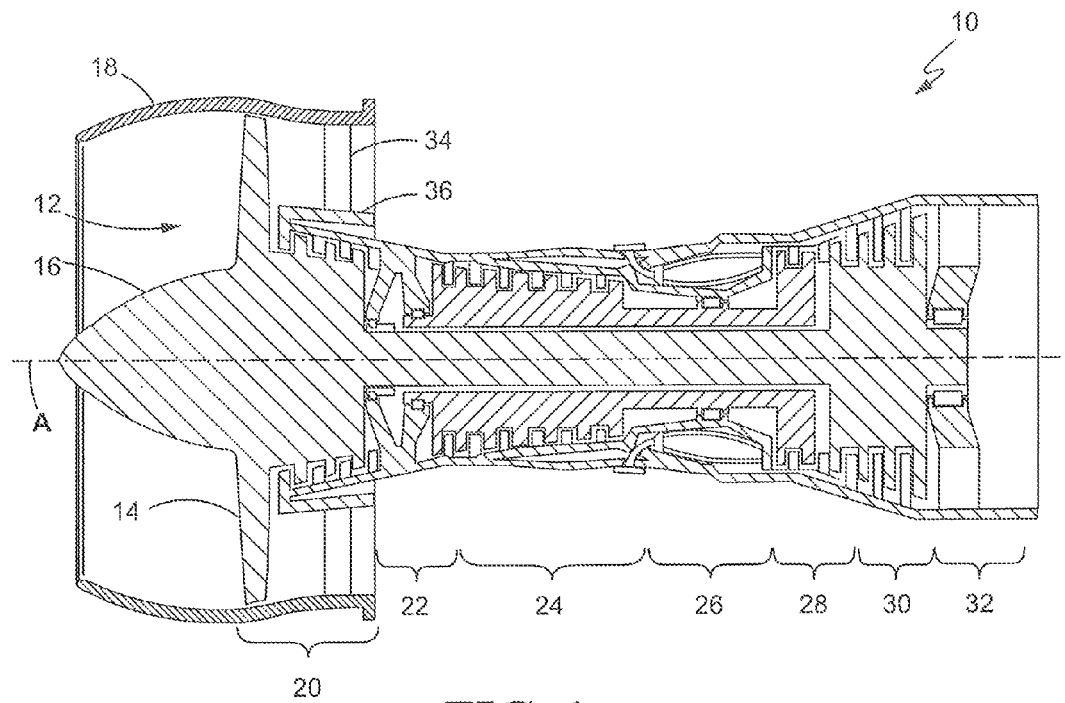
FIG. 1 is a longitudinal cross-sectional view of a gas turbine engine in which fan blades according to the present disclosure might be used.

FIG. 1 is a longitudinal sectional view of an exemplary turbofan jet engine 10 that may be equipped with fan blades according to the present disclosure. The engine 10 comprises an air intake port 12, fan blades 14 mounted on a hub 15 near the air intake port 12 and surrounded by a fan case 18 which is mounted within an engine housing or nacelle (not shown), a low pressure compressor (LPC) section 20, a bearing support section 22 aft of the LPC section 20, a high pressure compressor (HPC) section 24, a combustion chamber or combustor 26, a high pressure turbine 28 that provides rotational power to the HPC 24, a low pressure turbine 30 that provides rotational power to the LPC 20 and fan blades 14, and an exhaust outlet 32, all centered around an engine axis (A). A substantially conical spinner 16 (cap and body) is mounted over the hub forward the fan blades 14 to help guide air flow.

Figure 2:
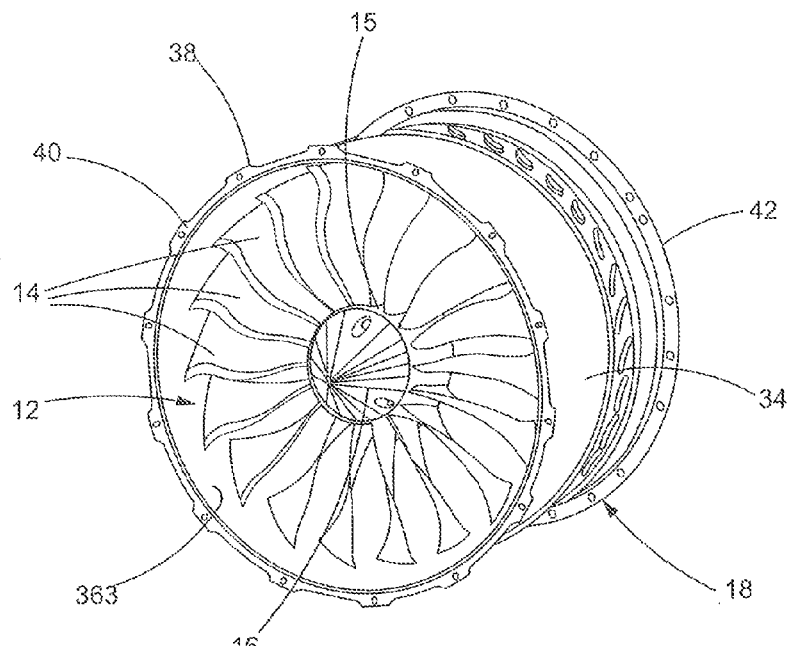
FIG. 2 is an enlarged view of a portion of the gas turbine engine of FIG. 1.

FIG. 2 is an enlarged view of a portion of the gas turbine engine 10 of FIG. 1, including the fan case 18 that surrounds the fan blades 14. The fan case 18 may include a hollow body 34, an abradable liner 36 disposed inside the hollow body 34, a forward flange 38 on the hollow body 34 defining a surface 40 for mating to a forward part of the nacelle (not shown), and a rear flange 42 for mating to an aft part of the nacelle (also not shown). The abradable liner 36 circumscribes the fan blades 14 which are coupled to the hub 15. The fan blades 14 extend radially outward from the annular hub 15.

Figure 3:
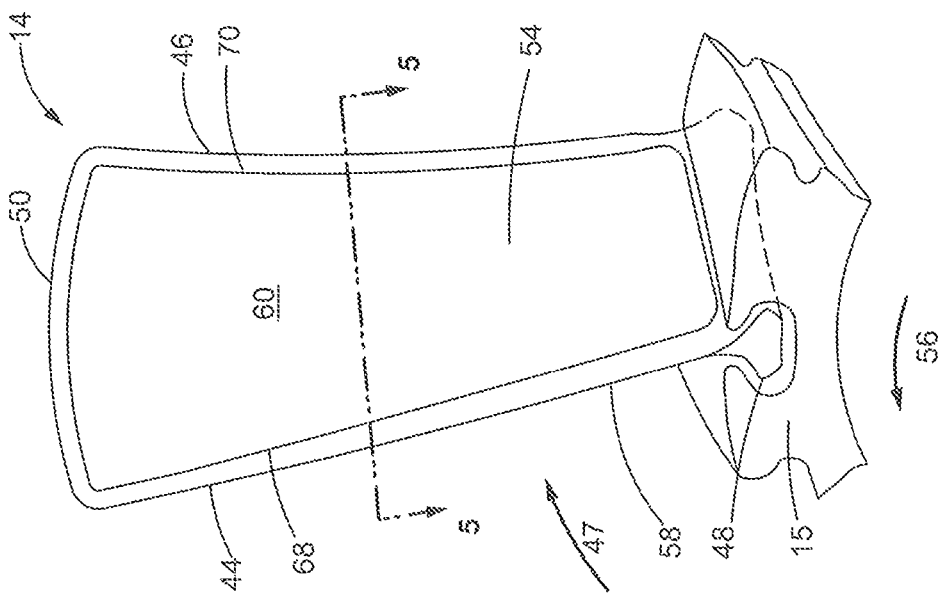
FIG. 3 is a perspective view of a single fan blade.

FIG. 3 is a perspective view of a single fan blade 14 coupled to the hub 15. The fan blade 14 includes a leading edge 44 and a trailing edge 46 with respect to the airflow direction as indicated by arrow 47. The fan blade 14 comprises a root 48 attached to the hub 15 and extends radially outward to a free tip 50. The fan blade 14 has a generally concave pressure side 52 and a generally convex suction side 54 joined together at the respective leading and trailing edges 44, 46. The fan blade 14 rotates in a rotational direction as illustrated by arrow 56. The pressure side 52 and the suction side 54 of the fan blade 14 are aerodynamically configured for maximizing the efficiency of air compression and achieving a desired pressure ratio.

It will be noted that fan blades for gas turbine engines may be provided in the variety of sizes, shapes and styles. The fan blades shown in the figures are but mere examples and are not intended to limit the disclosure. Further, the disclosed fan blade designs may be adapted for use in other types of jet engines, propellers, rotors, etc.

Still referring to FIG. 3, the fan blade 14 may include a body 58 and a cover 60 the purpose of which will be explained with reference to FIG. 4. The body 58 typically is fabricated from titanium, a titanium alloy, aluminum, aluminum alloy or other suitable structural material(s) that will be apparent to those skilled in the art. The cover 60 typically is fabricated from multiple plies of a fiber/resin composite material, usually graphite epoxy based, such as carbon fiber reinforced polymer (CFRP) and/or glass fiber reinforced polymer (GFRP). A protective coating may be applied over the composite cover 60 (not apparent in the figure), and may be made from an elastomer such as a fluoropolymer elastomer like VITON® fluoroelastomer.

Figure 4:
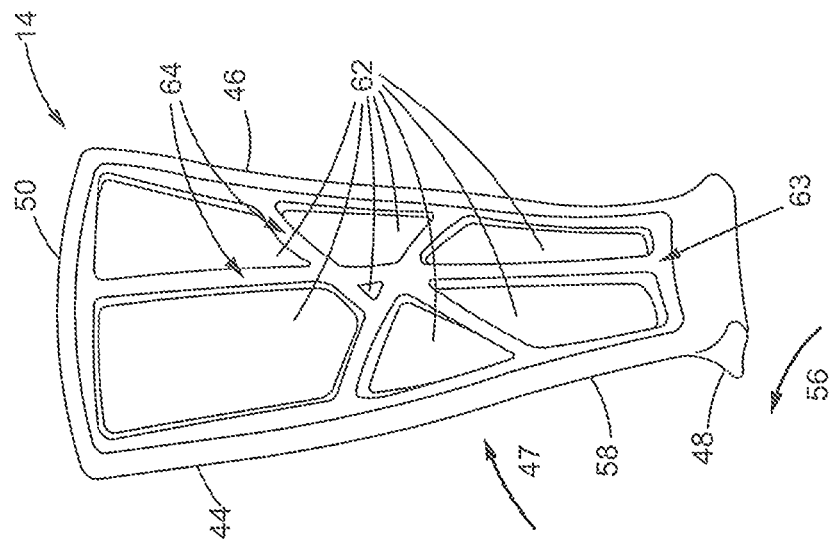
FIG. 4 is a perspective view of a single fan blade with the cover removed.
Figure 5:
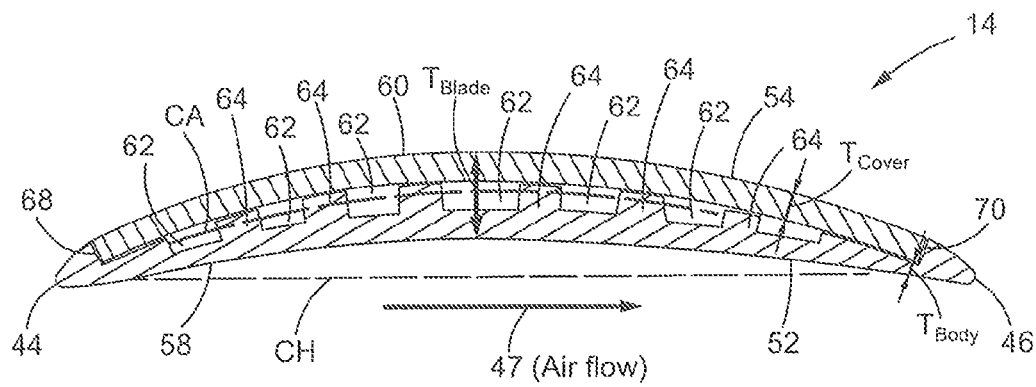
FIG. 5 is a cross-sectional view of the fan blade of FIG. 3 taken along line 5-5.

FIG. 4 is a perspective view of the fan blade 14 of FIG. 5 with the cover 60 removed. To reduce the weight of the fan blade 14, cavities 62 are formed through the suction side 54 of the fan blade 14 and are at least partly defined by stiffening ribs 64. The cavities 62 communicate with an opening 63 in the fan blade 14. The cover 60 is positioned over the opening 63 to provide a smooth surface for air flow 47 along the suction side 54 of the fan blade 14.

Still referring to FIG. 4, the ribs 64 that separate the cavities 62 comprise outer edges 66 that define an outer contoured surface that engages an underside of the cover 60. The cavities 62 may be filled wholly or partially with a filler material. The filler material may be structural material that forms a permanent part of the fan blade 14 or a sacrificial material that dissipates when the objective is to make the fan blade 14 as light as possible.

FIG. 5 is a cross-sectional view of the fan blade 14 of FIG. 3 taken along line 5-5. The fan blade 14 has a camber line CA defined as a curved line extending between the leading edge and the trailing edge halfway between the pressure side 52 and the suction side 54 of the fan blade 14. The fan blade 14 also has a chord line CH defined as a straight line extending between the fan blade leading edge 44 and the fan blade trailing edge 46. Since the fan blade 14 of FIG. 5 is asymmetrical, the camber line CA and the chord line CH are different.

The composite cover 60 comprises a cover leading edge 68 and a cover trailing edge 70 which generally correspond to the fan blade leading edge 44 and fan blade trailing edge 46. The cover 60 generally has a constant thickness $T_{Cover}$ in the direction perpendicular to the camber line CA. However, due to its airfoil shape, the thickness $T_{Blade}$ of the fan blade 14 varies in the transverse direction, i.e., the direction perpendicular to the camber line CA. Consequently, the thickness $T_{Body}$ of the fan blade body 58 also varies, and is smallest near the leading edge 44 and trailing edge 46. Extending the edges 68, 70 of the cover 54 toward the fan blade leading and trailing edges 44, 46 can result in the fan blade body 58 near the leading edge 44 and trailing edge 46 being too thin to provide sufficient strength against liberation of the edge of the fan blade body 58.

Figure 6:
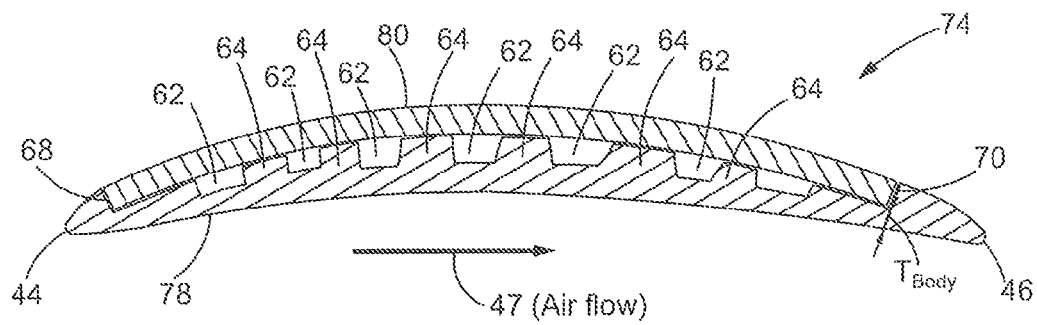
FIG. 6 is a cross-sectional view of another prior art fan blade.

FIG. 6 is a cross-sectional view of another fan blade 74. The cover leading and trailing edges 68, 70 have been moved inward (compared to FIG. 5), away from the fan blade leading edge 44 and trailing edge 46, to increase the thickness $T_{Body}$ of the fan blade body 78 under the cover leading edge 68 and under the cover trailing edge 70. This configuration can provide an acceptable fan blade body thickness under the cover edges 68, 70 and acceptable solidity. But this configuration can also add weight at the fan blade leading and trailing edges 44, 46 and decrease torsional stiffness if the fan blade body 58 material has a higher density than the composite cover 80.

Figure 7:
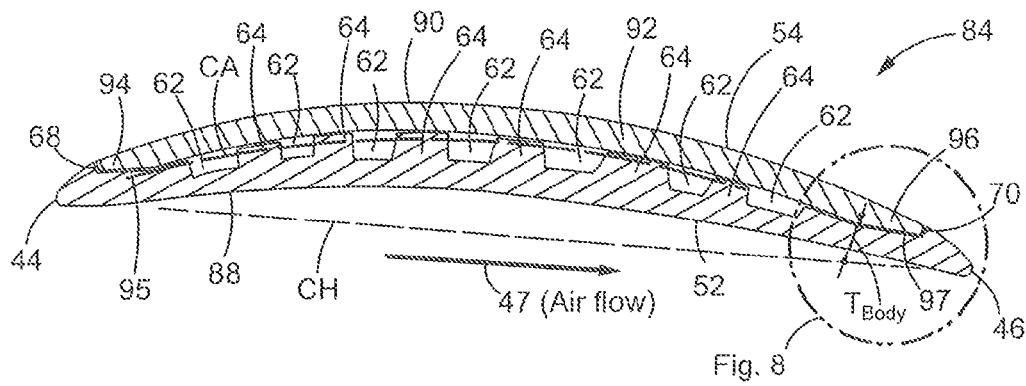
FIG. 7 is a cross-sectional view of a fan blade according to the present disclosure.

FIG. 7 is a cross-sectional view of a fan blade 84 according to the present disclosure. Like the fan blades 14, 74 in FIGS. 5 and 6, the fan blade cross-section has a camber line CA and a chord line CH. Also like the fan blades 14, 74 in FIGS. 5 and 6, the fan blade 84 in FIG. 7 may comprise a titanium body 88 and a composite cover 90, with the body 88 made of a denser material than the cover 90. The cover 90 comprises a cover leading edge 68 and a cover trailing edge 70 which generally correspond to the fan blade leading edge 44 and trailing edge 46. The cover 90 further comprises a central portion 92 preferably having a uniform thickness, a leading portion 94 extending fore of the central portion 92 and terminating at the cover leading edge 68, and a trailing portion 96 extending aft (rearward from) the central portion 92 and terminating at the cover trailing edge 70.

Unlike the covers in FIGS. 5 and 6, the thickness of the cover 90 varies in the direction of the air flow 47, i.e., the direction substantially parallel to the chord line CH. More specifically, the cover leading portion 94 is chamfered, that is, it becomes thinner in the direction of the cover leading edge 68. Similarly, the cover trailing portion 96 is chamfered and tapers in the direction of the cover trailing edge 70. Although the cover 90 in FIG. 7 is chamfered at both ends, it should be understood that the cover 90 may be chamfered at both ends or only one end. The chamfered surfaces may be flat, curved, stepped or any suitable configuration that provides a cover 90 that becomes thinner in the direction of the leading and/or trailing edges 68, 70.

FIG. 8 is a close up view of the trailing portion of the fan blade 84 of FIG. 7. The chamfered surface 97 of the cover trailing portion 96 (and the chamfered surface 95 of the cover leading portion 94) are flat in this embodiment. The cover trailing portion 96 extends from the cover center portion 92 to the cover trailing edge 70. The trailing portion 96 of the cover 90 has the same thickness as the central portion 90, then tapers to a lesser thickness at the cover trailing edge 70. In effect, the maximum thickness of the cover 90 has been moved inward, away from the cover trailing edge 70.

This chamfered configuration has a number of benefits. First, chamfering the cover 90 at its leading portion 94 and/or trailing portion 96 moves the area of minimal thickness of the fan blade body 88 inward (from position $T_1$ to position $T_2$ in FIG. 8), toward the center of the fan blade 84 and away from the relatively narrow regions near the fan blade edges 44, 46.

Second, chamfering the cover 90 allows the relatively lower weight and lower density trailing edge 70 of the cover 90 to be extended as far as possible toward the fan blade trailing edge 46. Since the density of the composite material in the cover 90 is less than the density of the titanium in the body 88, the mass of the fan blade 84 near the fan blade trailing edge 46 is reduced. It may be desirable to make the chamfer (taper) as small as possible, and thus make the cover 90 as thick as possible, near the leading and trailing edges 44, 46 to remove as much weight as possible from the leading and trailing edges 44, 46. However, for a composite cover, shrinking the chamfer is limited by the resulting higher stresses for the composite.

Third, the reduced mass at the portion of the leading and trailing edges near the blade tip 50 increases the torsional frequency of the blade 84. This prevents vibration problems if the lower torsional stiffness leads to a low order natural frequency of the blade 84 that is in the engine operating range. Reducing the mass of the fan blade 84 near its edges 44, 46 in the outer span helps maintain an acceptable overall torsional stiffness.

Fourth, the chamfered leading and trailing portions 94, 96 help prevent the cover 90 from disbonding from the body 88 due to foreign object impacts, since the cover 90 is thinner along its leading and trailing portions 94, 96, and thus more conformable to blade deflections.

Preferably the body 88 is chamfered (made thinner, such as by tapering or beveling) in complimentary fashion so that the body 88 and cover 90 mate properly along the fan blade leading and trailing edges 44, 46.

Optionally, the cover 90 may be similarly chamfered along the edges adjacent the fan blade root 48 and tip 50.

In another aspect of the disclosure a method for fabricating a fan blade 84 of a turbofan gas turbine engine 10 is provided. The method may comprise the following steps:

manufacturing a body 88 including a pressure side 52 and a suction side 54, the pressure side 52 and the suction side 54 being disposed between and connected to a leading edge 44 and a trailing edge 46, the suction side 54 including an opening 63 communicating with one or more cavities 62 located on the suction side 54;

providing a cover 90 configured to fit over the opening 63 and comprising a cover leading edge 68 and a cover trailing edge 70 which generally align with the fan blade leading edge 44 and trailing edge 46 respectively, the cover 90 further comprising a central portion 92, a chamfered leading portion 94 extending fore of the central portion 92 and terminating at the cover leading edge 68, and a chamfered trailing portion 96 extending aft of the central portion 92 and terminating at the cover trailing edge 70; and covering the opening 63 with the cover 90.

In the method described above the cover leading portion 94 may have the same thickness as the central portion 90, then taper to a smaller thickness at the leading edge 68. Likewise, the cover trailing portion 96 may have the same thickness as the central portion 90, then taper to a smaller thickness at the trailing edge 70.

In the method described above the body 88 may be chamfered near the leading edge 44 and the trailing edge 46 and the body 88 and the cover 90 may abut along their respective chamfered surfaces.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed:

1. A fan blade comprising:
a body having a pressure side, a suction side adjoining the pressure side along a fan blade leading edge and a fan blade trailing edge, the suction side defining an opening having a perimeter and communicating with one or more cavities disposed in the body; and
a cover configured to fit over the opening and comprising a cover leading edge and a cover trailing edge which generally align with the fan blade leading edge and the fan blade trailing edge respectively, the cover further comprising a central portion, a cover leading portion extending forward of the central portion and terminating at the cover leading edge, and a cover trailing portion extending aft of the central portion and terminating at the cover trailing edge;
wherein one or both of the cover leading portion and the cover trailing portion are chamfered; and
wherein at least one of the cover leading portion or the cover trailing portion comprises a flat chamfered surface.

2. The fan blade of claim 1 wherein: the leading portion is chamfered.

3. The fan blade of claim 1 wherein: the trailing portion is chamfered.

4. The fan blade of claim 1 wherein:
the leading portion is chamfered; and the trailing portion is chamfered.

5. The fan blade of claim 1 wherein:
the leading portion tapers in the direction of the cover leading edge; and the trailing portion tapers in the direction of the cover trailing edge.

6. The fan blade of claim 4 wherein:
the leading portion comprises a flat chamfered surface; and the trailing portion comprises a flat chamfered surface.

7. The fan blade of claim 4 wherein:
one of the leading portion or the trailing portion comprises a curved chamfered surface.

8. The fan blade of claim 4 wherein:
one of the leading portion or the trailing portion comprises a stepped chamfered surface.

9. The fan blade of claim 1 wherein:
the leading portion has substantially the same thickness as the central portion, then tapers to a smaller thickness at the cover leading edge; and
the trailing portion has substantially the same thickness as the central portion, then tapers to a smaller thickness at the cover trailing edge.

10. The fan blade of claim 2 wherein:
the area of minimal thickness of the fan blade body is located inward of the cover trailing edge.

11. The fan blade of claim 4 wherein:
the body comprises chamfered portions near the fan blade leading edge and the fan blade trailing edge; and
the body and the cover abut along their respective chamfered portions.

12. The fan blade of claim 1 wherein:
the opening communicates with one or more cavities disposed in the suction side of the body.

13. The fan blade of claim 1 wherein:
the opening communicates with one or more cavities disposed in the pressure side of the body.

14. The fan blade of claim 1 wherein:
the fan blade body is made of a denser material than the cover.

15. A fan blade cover configured to fit over an opening in a fan blade body, the cover comprising:
a cover leading edge;
a cover trailing edge downstream of the cover leading edge;
a central portion disposed between the cover leading edge and the cover trailing edge; a leading portion extending forward of the central portion and terminating at the cover leading edge; and
a trailing portion extending aft of the central portion and terminating at the cover trailing edge; wherein
one or both of the cover leading portion and the cover trailing portion are chamfered; and
wherein at least one of the cover leading portion or the cover trailing portion comprises a flat chamfered surface.

16. The fan blade cover of claim 14 wherein:
the leading portion has the same thickness as the central portion along an area adjoining the central portion and tapers to a smaller thickness at the cover leading edge.

17. The fan blade cover of claim 14 wherein:
the trailing portion has the same thickness as the central portion along the area adjoining the central portion and tapers to a smaller thickness at the cover trailing edge.

18. The fan blade cover of claim 14 wherein:
the opening communicates with one or more cavities disposed in a suction side of the fan blade body.

19. A method for fabricating a fan blade of a turbofan gas turbine engine comprising the steps of:
manufacturing a body including a pressure side and a suction side, the pressure side and the suction side being disposed between and connected to a leading edge and a trailing edge, the suction side defining an opening communicating with one or more cavities in the suction side;
providing a cover configured to fit over the opening and comprising a cover leading edge and a cover trailing edge, the cover further comprising a central portion, a chamfered leading portion extending forward of the central portion and terminating at the cover leading edge, and a chamfered trailing portion extending aft of the central portion and terminating at the cover trailing edge, at least one of the chamfered leading portion or the chamfered trailing portion comprises a flat chamfered surface; and
covering the opening with the cover.

20. The method of claim 14 wherein:
the cover leading portion tapers in the direction of the cover leading edge; and
the cover trailing portion tapers in the direction of the cover trailing edge.

* * * * *